United States Patent [19]
Tachibana et al.

[11] Patent Number: 5,233,437
[45] Date of Patent: Aug. 3, 1993

[54] RECORDING/REPRODUCTION APPARATUS FOR HIGH-DEFINITION VIDEO SIGNAL

[75] Inventors: Kaoru Tachibana; Ken Morita; Hiroo Takahashi, all of Kanagawa, Japan

[73] Assignee: Sony Corporation, Tokyo, Japan

[21] Appl. No.: 449,185

[22] Filed: Dec. 13, 1989

[30] Foreign Application Priority Data

Dec. 29, 1988 [JP] Japan .................. 63-335442

[51] Int. Cl.⁵ .............................................. H04N 5/94
[52] U.S. Cl. ............................................... 358/336
[58] Field of Search ............... 358/314, 336; 360/38.1

[56] References Cited

U.S. PATENT DOCUMENTS

| | | |
|---|---|---|
| 3,824,620 | 7/1974 | Langer . |
| 4,250,521 | 2/1981 | Wright ................. 358/336 |
| 4,419,687 | 12/1983 | Dischert et al. ............. 358/314 |
| 4,472,745 | 9/1984 | Foerster et al. . |
| 4,628,371 | 12/1986 | Kuroda . |
| 4,638,380 | 1/1987 | Wilkinson et al. ............. 360/38.1 |
| 4,647,983 | 3/1987 | Ota et al. . |

FOREIGN PATENT DOCUMENTS 171759 2/1986 European Pat. Off. .
206045 3/1988 European Pat. Off. .

OTHER PUBLICATIONS

"Le Haut-Parleu" No. 1753, Jun. 1988, pp. 78-82.

*Primary Examiner*—Donald McElheny, Jr.
*Attorney, Agent, or Firm*—Lewis H. Eslinger; Jay H. Maioli

[57] ABSTRACT

A recording/reproduction system performs high precision drop-out processing and compensation in the reproduction mode from a disk-shaped recording medium by using a recording format in which a video signal is divided alternately in units of one horizontal scan line into two channels, and the timing of the recorded video signal on one channel is displaced relative to that of the other channel, so as to record the divided signals on a pair of parallel spiral tracks forming the two channels on the disk. A mean value interpolation circuit is provided in each channel for drop-out compensation, and a portion of a reproduced signal of one channel is compensated by a compensation signal produced by the interpolation circuit of the other channel.

3 Claims, 9 Drawing Sheets

FIG.2

FIG. 3A (Y)
FIG. 3B (P_R)
FIG. 3C (P_B)
FIG. 3D (CH-1) DISK
FIG. 3E (CH-2)

FIG. 4A (CH-1), FIG. 4B (CH-2), FIG. 6A (CH-1), FIG. 6B (CH-2), FIG. 6I (MIX), FIG. 6W (B,R), FIG. 6X (Y), FIG. 6Y (B), FIG. 6Z (R)

FIG. 8A (CH-1) through FIG. 8I (MIX)

RECORDING/REPRODUCTION APPARATUS FOR HIGH-DEFINITION VIDEO SIGNAL

BACKGROUND OF THE INVENTION

1. Field of the Invention

This invention relates generally to a recording and/or reproducing apparatus for wide band video signals and, more particularly, to a system for compensating drop-outs during playback of such signals.

2. Description of the Background

A multi-channel recording system has been proposed for recording wide-band video signals having a luminance signal bandwidth of about 20 MHz and a chrominance signal bandwidth of about 6 MHz on an optical disc. Such wide-band video signals are found in the so-called high-definition television (HDTV). The video signals are encoded prior to recording and are distributed into plural channels and then recorded on parallel tracks formed in correspondence to the plural channels. The reproduced signals are decoded back to original video signals in a reproduction mode. Through use of this system, even though the rotational speed of the recording medium is not high, the rate of recorded information per unit time is increased by the number or recording channels. Therefore, a wide-band video signal can be recorded and reproduced using known record media and associated hardware.

If there are two channels, a pair of parallel tracks are spirally formed on a disk. More specifically, the video signals are simultaneously recorded by optical heads arranged in parallel relative to the corresponding tracks for the two channels during the recording mode. Subsequently, the video signals are simultaneously reproduced from the tracks by the parallel optical heads in a reproducing mode.

It has been found that degradation of an image due to a signal drop-out caused when high-definition video signals are reproduced tends to be more conspicuous compared with the effects of such drop-outs when normal video signals are reproduced.

In order to compensate for drop-outs a system has been conventionally employed in which a one horizontal scanning period (1H) memory, or 1H delay line is provided. Upon the occurrence of a dropout, the drop-out signal portion is compensated by signals of the immediately preceding line, which have been accumulated in the 1H memory or delayed in the 1H delay line. Although this system is relatively simple, if drop-out compensation is performed in an oblique line portion of the reproduced image, a discrete step may undesirably appear in that oblique line of the reproduce image because of the repeating of the preceding line data.

In another compensation system, a 3H memory is used, wherein if a drop-out occurs, compensation is performed by using the mean value of the memory contents, which are based on the immediately preceding line and succeeding line periods of the drop-out line interval. When this system is employed, a discrete step in the oblique lines of the reproduced image is not so conspicuous as in the case of the 1H memory. Nevertheless, some degradation of the image is still present. Such degradation is still unacceptable in high-definition television.

SUMMARY OF THE INVENTION

Accordingly, it is an object of the present invention to provide a drop-out compensation system that overcomes the drawbacks inherent in previously proposed systems.

It is another object of the present invention to provide a drop-out compensation system for a video disk recording/reproducing system in which a 3H memory is used and a recording video signal is divided into two channels.

In a video disk recording system according to one aspect of the present invention, a video signal is alternately divided into two channels in units of one horizontal interval (1H), and the divided video signals are time-expanded to obtain continuous signals for respective channels. At the same time, the timing of recording video lines on one channel is displaced relative to that one the other channel by an integral multiple of 1H, these video signals are then recorded on a pair of parallel spiral tracks for the two channels.

In a video disk reproduction apparatus according to another aspect of the present invention, the video disk reproducing apparatus comprises a decoding circuit for time-compressing the signals reproduced from the two channels, and correcting the above-mentioned timing displacement, to obtain the original form of the sequential frames of the video signal. A compensation circuit, arranged in each channel, forms a drop-out compensation signal approximated to the signal of one channel by an interline mean value of the reproduced signals of the other channel, and a drop-out correction circuit detects a drop-out of the reproduced signals from one channel and substitutes the drop-out portion in the line sequential signal by the compensation signal obtained from the other channel.

Since the video signal is alternately divided into two channels in horizontal scan line units, a dropout compensation signal approximated to one channel can be formed from another channel by an interline mean value signal derived from the reproduced signals. In addition, because a timing displacement, which may be thought of as a skew, is formed between the channels, even if a drop-out has occurred in one channel there is a low probability that the compensation signal formed from the other channel will be adversely affected by the drop-out. Therefore, satisfactory drop-out processing can be performed by signal compensation in accordance with the present invention. Since this compensation is mean value compensation, oblique lines of an image are maintained continuous in compensated portions in the reproduced image. A high-quality reproduced image compatible with the goals of HDTV is obtained.

The above and other objects, features and advantages of the present invention will become apparent form the following detailed description of illustrative embodiments thereof to be read in conjunction with the accompanying drawings, in which like reference numerals represent the same on similar elements.

DETAILED DESCRIPTION OF THE PREFERRED EMBODIMENT

Figure 1:
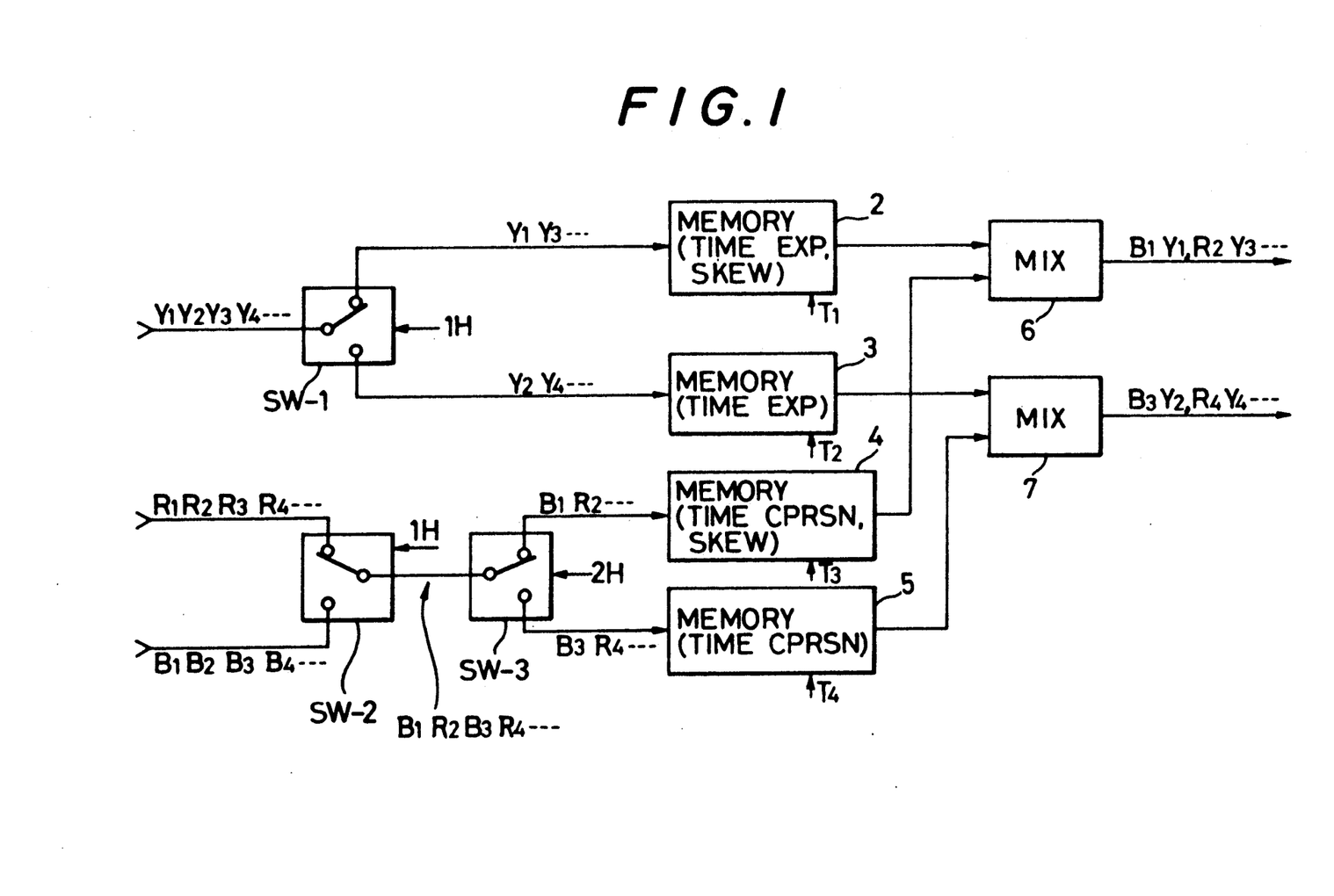
FIG. 1 is a schematic in block diagram form of a portion of a recording system of a high-definition video disk recording/reproduction apparatus to which the present invention is applied.
Figure 2:
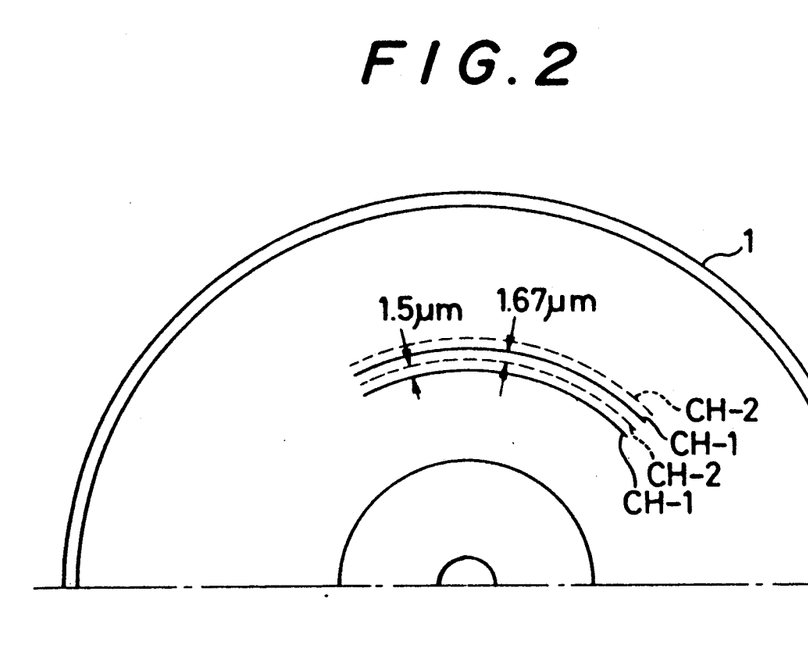
FIG. 2 is a pictorial representation showing a track format of a video disk.

In FIG. 1 a main encoder portion of a recording system for a high-definition video optical disk recording/reproduction apparatus to which the present invention applies is shown. FIG. 2 represents a track format used in such video disk. The video disk 1 is of the optical type, and may be a disk which allows recording, reproduction, and erasure, or a disk which allows the recording operation only once and in which data therein cannot be erased, or it may be a pressed, reproduction-only optical disk.

In disk 1, two tracks, representing first and second channels (CH-1 and CH-2) are spirally formed, so as to be parallel to each other from an inner periphery to an outer periphery of disk 1. The track pitch between the tracks corresponding to the two channels may be 1.5 $\mu$m, for example. Two laser beams are modulated by video signals, and the modulated signals are simultaneously recorded in the two channels, so that pits corresponding to the modulated FM carrier are formed on the respective tracks. An incoming single frame video signal is recorded on the two tracks corresponding to the two channels. When the angular velocity of the disk is constant, 1,800 rpm for example, one frame of video signal is recorded upon each revolution of the disk.

The space (rotational pitch) between each second-channel track (CH-2) and the adjacent first-channel track (CH-1) is 1.67 $\mu$m, for example. However, since interference due to crosstalk hardly occurs because of the correlation of video data between the channels, the space between each pair of parallel tracks can be made smaller than the track pitch, which was 1.5 $\mu$m. Therefore, the recording density in this case is higher than that obtained when all the tracks are formed having equal pitch. Thus, the track pitch between the channels can be decreased to about 1.1 $\mu$m in correspondence with the degree of correlation of the signal being recorded. In this fashion, the recording time can be increased by about 20%. When the degree of correlation changes a great deal in one disk, a track interval between the channels may be varied in correspondence with the degree of correlation.

The audio signal that corresponds to the video signal can be recorded in the form of time-compressed PCM signals during the vertical blanking period of the video signal.

On the reproduction side, three laser beams are used, and focus and tracking operations are performed by the central beam, with the data in the two tracks being simultaneously read by the two side beams.

Figures 3A, 3B, 3C:
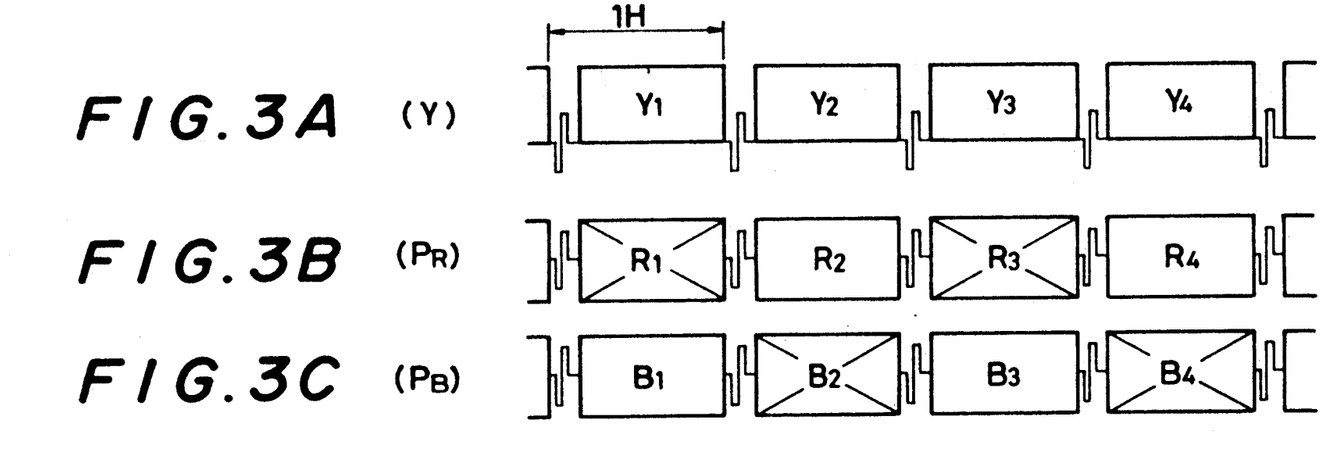
FIGS. 3A-3E are timing charts of video signals showing a recording format.
Figure 3D:
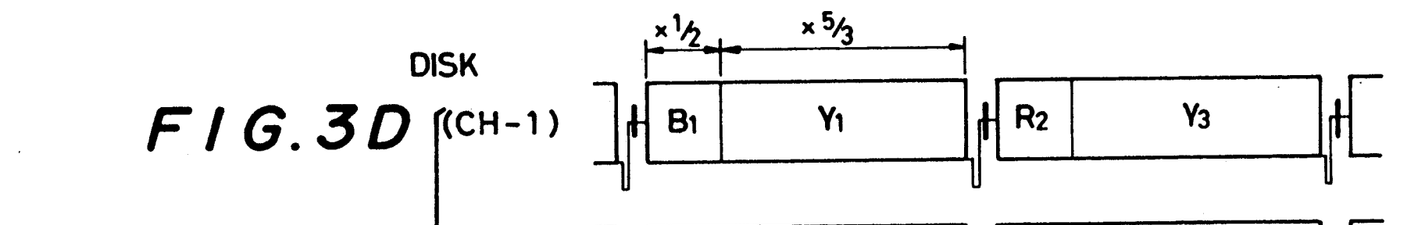
Figure 3E:
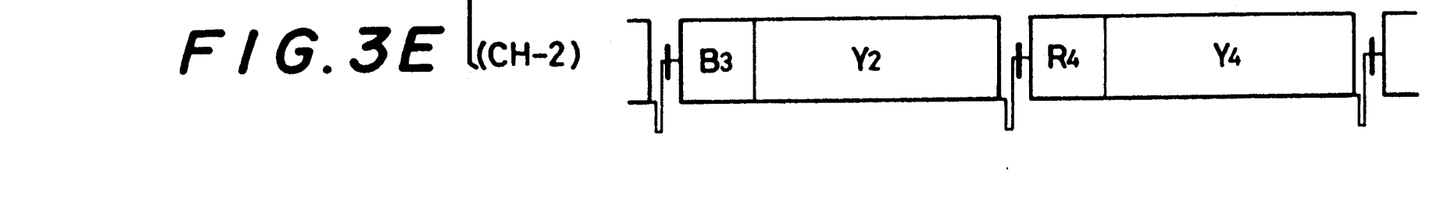

As represented in the waveform charts of FIGS. 3A to 3C, the video signal to be recorded includes a luminance signal, Y of FIG. 3A, having a bandwidth of 20 MHz, and a red chrominance signal, $P_R$ of FIG. 3B, and a blue chrominance signal, $P_B$ of FIG. 3C, each having a bandwidth of 6 MHz. As shown in FIGS. 3D and 3E, the luminance signal Y is time-expanded to be 5/3 times the original signal, and the expanded signals are alternately recorded on the channel tracks CH-1 and CH-2 on the disk. In this case, each first channel includes the corresponding one of the odd-numbered luminance lines ($Y_1, Y_3, \ldots$), and each second channel includes the corresponding one of the even-numbered luminance Y lines ($Y_2, Y_4, \ldots$).

The chrominance signals B and R are respectively time-compressed by $\frac{1}{2}$, and are time-respect division multiplexed (TDM) with the luminance signal Y. At this time, the even-numbered lines ($B_2, B_4, \ldots$) of the chrominance signal B and odd-numbered lines ($R_1, R_3, \ldots$) of the chrominance signal R are eliminated and not recorded and the odd-numbered lines ($B_1, B_3, \ldots$) of the chrominance signal B and even-numbered lines ($R_2, R_4, \ldots$) of the chrominance signal R are respectively divided into two channels for recording. Therefore, in each track, the two chrominance signals R and B are alternately arranged in a line-sequential manner.

As shown in FIGS. 3A-3E, 1H on the disk corresponds to 2H of the recording signal. When the Y signal is time-expanded by 5/3 times, the maximum recording frequency at the baseband is decreased from 20 MHz to 12 MHz. When the chrominance signals are time-compressed by $\frac{1}{2}$ times, the recording frequency at the baseband is increased from 6 MHz to 12 MHz. Therefore, on the disk, the Y, R, and B signals each having a bandwidth of 12 MHz are recorded in the form of FM modulation.

Figure 4A:
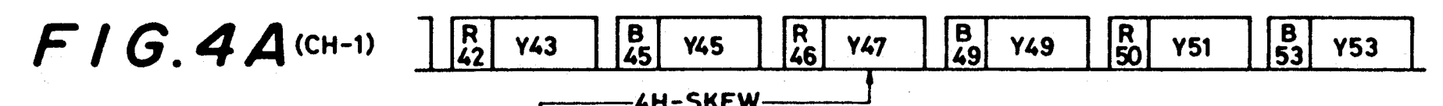
FIGS. 4A and 4B are timing charts of video signals showing a recording format.
Figure 4B:
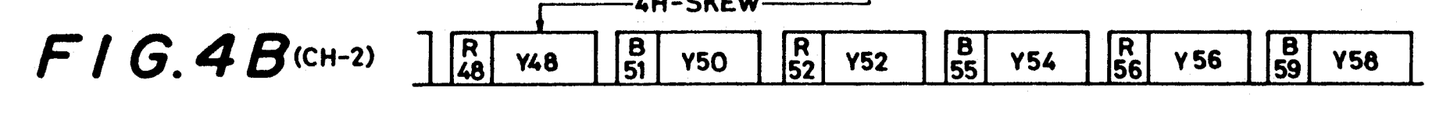

In order to perform satisfactory drop-out compensation in a manner to be described below, a 4H (2H on the disk) skew is provided between the first and second channels, as shown in the format in FIGS. 4A and 4B. In this embodiment, the recording operation in the first channel is delayed from that in the second channel by 4H.

In the block diagram of FIG. 1, an encoder is shown for converting input video signals in accordance with the above-mentioned recording format, that is, channel division, channel skew, and time expansion and compression. The input luminance signal Y is divided into the first channel ($Y_1, Y_3, \ldots$) and second channel ($Y_2, Y_4, \ldots$) by a branch switch SW-1 switched at every horizontal line interval (1H), and the signals are written in time expansion memories 2 and 3, respectively. the contents of memories 2 and 3 are time-expanded in response to a read-clock signal having a frequency that is 3/5 times that of a write-clock signal and are respectively read out in response to timing signals $T_1$ and $T_2$.

On the other hand, the input chrominance signals R and B are fed in parallel to a selection switch SW-2 and alternately switched at every H interval so that the B signals in the odd-numbered lines and the R signals in the even-numbered lines are alternately selected and output, thus obtaining a serial signal ($B_1R_2B_3R_4\ldots$). This line sequential signal is divided into the first channel ($B_1R_2\ldots$) and the second channel ($B_3R_4\ldots$) by a branch switch SW-3 switched at every 2H interval, and the divided signals are written in time compression memories 4 and 5, respectively. The contents of memories 4 and 5 are time-compressed in response to a read-clock signal having a frequency two times that of a write-clock signal, and are respectively read out in response to timing signals $T_3$ and $T_4$.

The read timings of memories 2, 3, 4, and 5 are respectively controlled in response to the timing signals $T_1$, $T_2$, $T_3$, and $T_4$ to achieve a time-divisional relationship therebetween, as represented in FIGS. 3D and 3E. The first channels are mixed by a mixing circuit 6 and the second channels are mixed by a mixing circuit 7, so that a pair of parallel signals for two channels of $B_1Y_1$, $R_2Y_2, \ldots$, and $B_3Y_3, R_4Y_4, \ldots$, are generated as shown in FIGS. 3D and 3E.

Memories 2 and 4 for the first channels have a channel skew function and cause output timings of the luminance and chrominance signals in the first channels to be delayed from those in the second channels by 4H. As a result, wide-band video signals are recorded on the disk 1 in the format shown in FIGS. 4A and 4B.

Figure 5:
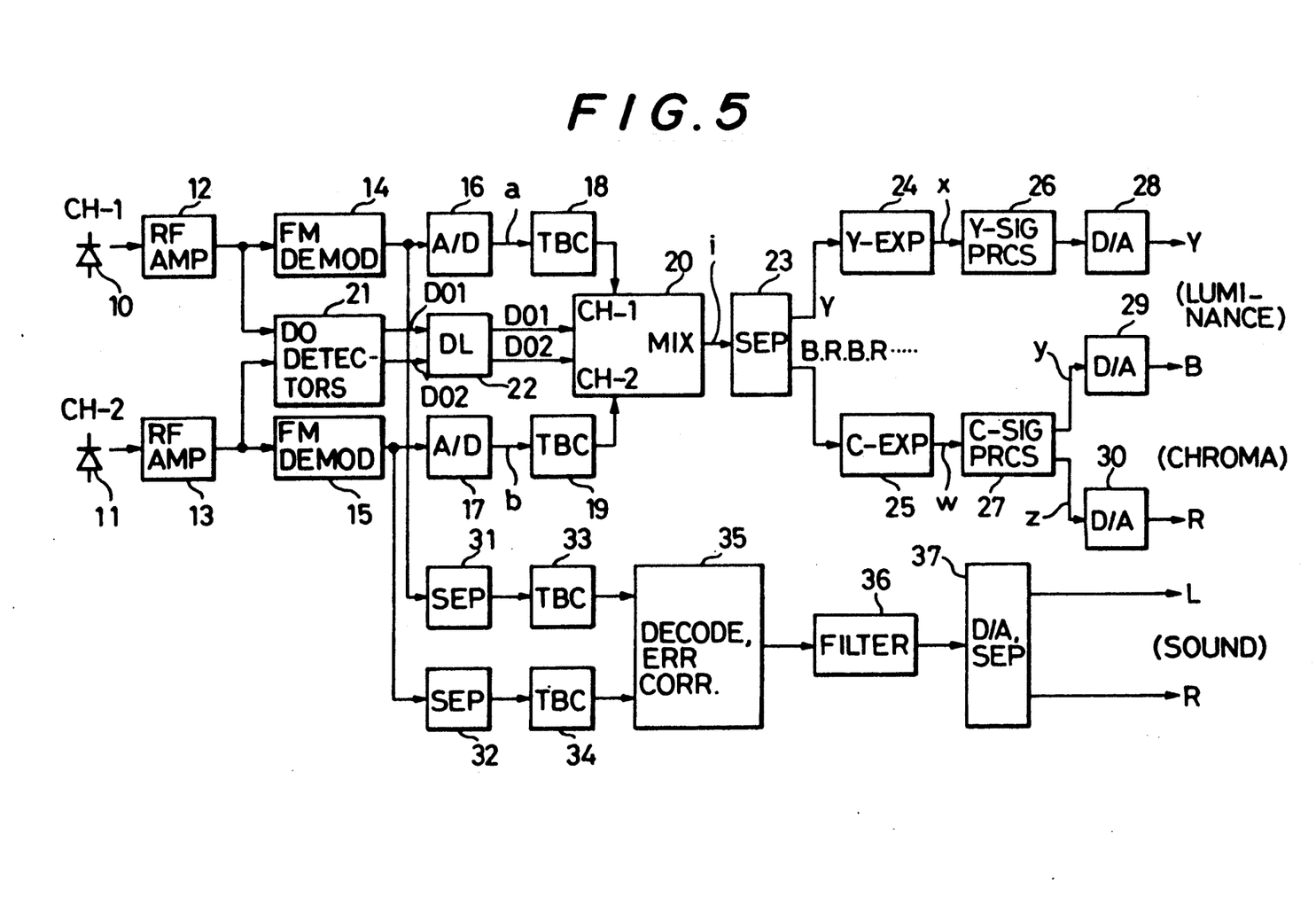
FIG. 5 is a schematic in block diagram form of a portion of a reproduction system in a high-definition video disk system to which the present invention is applied.
Figure 6A:
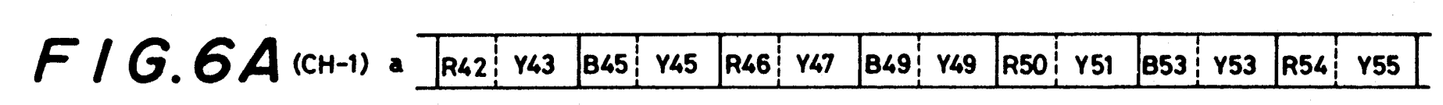
FIGS. 6A, 6B, 6I, 6W, 6X, 6Y and 6Z are timing charts of video signals useful in explaining reproduction processing.

FIG. 5 is a block diagram of a reproduction system, and FIGS. 6A+ are timing charts for reproduction processing. As described above, the pair of parallel tracks on the disk 1 are simultaneously read by a parallel beam pickup head. The reproduced signals are obtained from two photodetectors 10 and 11 for the two channels and are respectively supplied to FM demodulators 14 and 15 through RF amplifiers 12 and 13. The demodulated video outputs are then converted into digital signals by A/D converters 16 and 17, respectively.

Figure 6B:
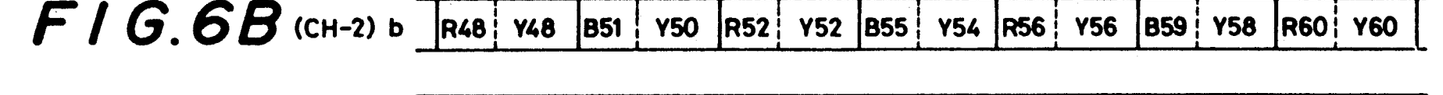
Figure 6I:
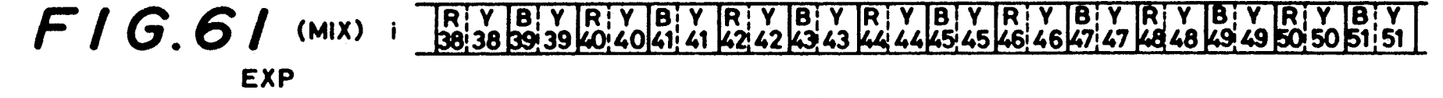

Signal processing is performed in response to the digital signals as follows. Digital video signals a and b for each channel, respectively shown in FIGS. 6A and 6B, are time-base corrected by time base correctors 18 and 19 to obtain a line sequential serial signal i shown in FIG. 6I from a mixing circuit 20. Mixing circuit 20 has a function for compressing the time base of the signals in each channel by ½, correcting their skews, and decoding line sequential format as shown in FIG. 6I. Since this function can be realized by a memory of several lines, the line memories for time base correctors 18 and 19 may have the function of mixing circuit 20 in a modified embodiment.

Mixing circuit 20 also has a drop-out compensation function utilizing the line memories. More specifically, a drop-out of the disk reproduced signal is detected by a drop-out detector 21 for respective channels in response to outputs from RF amplifiers 12 and 13, so that a first drop-out detector is coupled to a first video signal reproduced from the first track for generating a first drop-out detection signal DO1 and a second drop-out detector is coupled to the second video signal reproduced from the second track for generating a second drop-out detection signal DO2. Drop-out detection signals DO1 and DO2 are supplied to mixing circuit 20 as compensation control signals through a delay circuit 22. During a drop-out period, mean value compensation signals formed on the basis of the outputs from the line memories are output in place of the drop-outs in the reproduced signals.

Figure 6W:
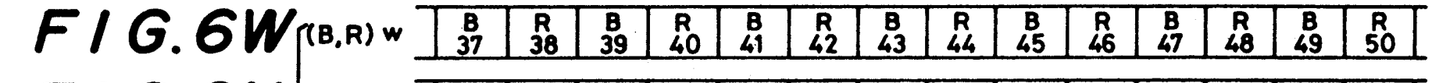
Figure 6X:
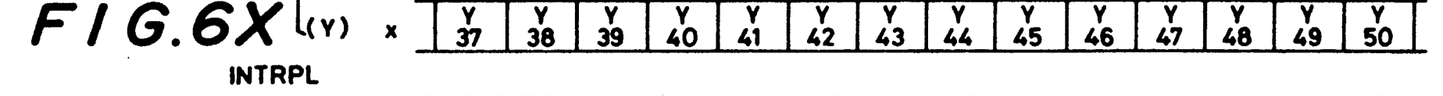
Figure 6Y:
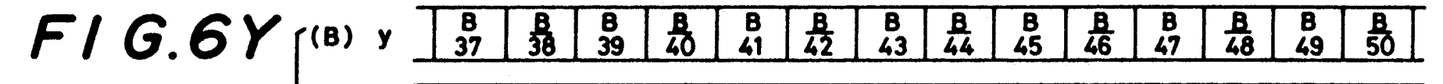
Figure 6Z:
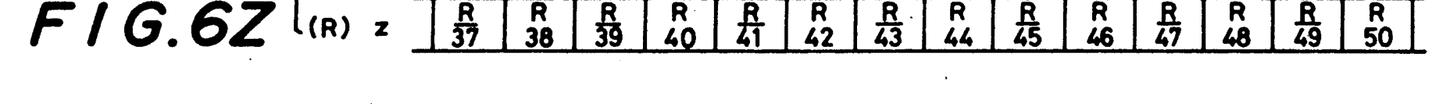

The line sequential signal i output from mixing circuit 20 is separated into a luminance signal Y and chrominance signals R and B by a separator 23, and the separated signals are time-expanded to obtain normal time-base signals w and x, shown in FIGS. 6W and 6X, by Y and C expansion circuits 24 and 25, respectively. The expansion ratio of the Y expansion circuit 24 is 6/5 times, and the expansion ratio of the C expansion circuit 25 is four times. Outputs from expansion circuits 24 and 25 are subjected to analog processing such as frequency and amplitude adjustment by Y and C signal processors 26 and 27, respectively. As shown in FIGS. 6Y and 6Z, in C signal processor 27 the line sequential signals B and R are separated into parallel signals, and the R and B signals in the odd-numbered and even-numbered lines that were eliminated upon recording are regenerated by an interpolation process based on the preceding and succeeding video lines.

Outputs from signal processors 26 and 27 are supplied to D/A converters 28, 29, and 30, so that the luminance signal Y, and the chrominance signals B and R are obtained.

In regard to the audio portion, a PCM signal recorded during a vertical blanking period is extracted from the outputs supplied by FM demodulators 14 and 15 by separators 31 and 32. The separated audio signals are respectively subjected to time-base correction and time expansion by time-base correctors 33 and 34, and are subjected to digital signal processing such as PCM decoding, deinterleaving, error detection, error correction, and compensation by a decoding error correction circuit 35.

An output from decode error correction circuit 35 is frequency band-limited by a filter 36, and the band-limited signal is divided into analog audio signals L and R for the two channels by a separator and D/A converter 37.

Figure 7:
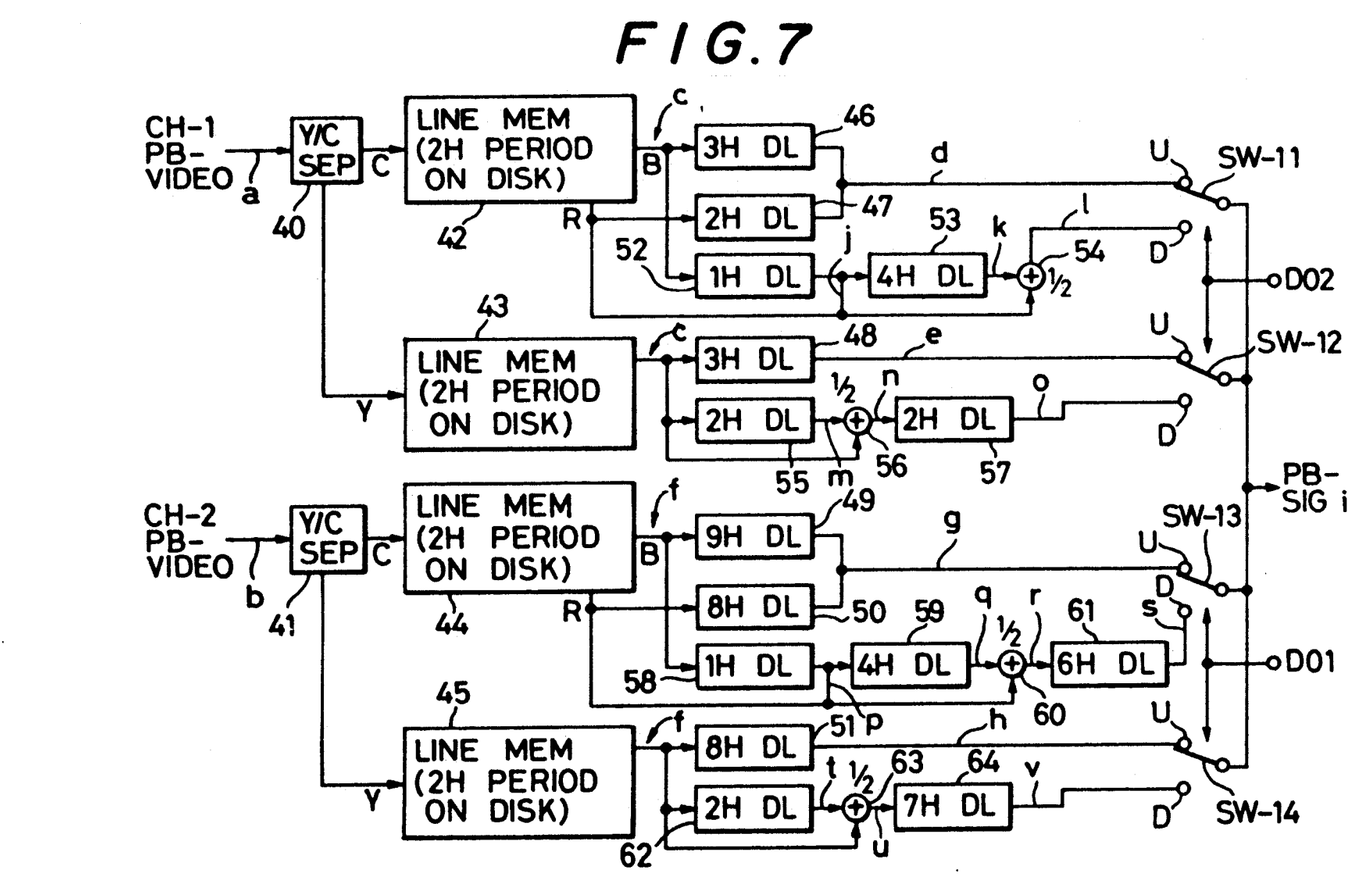
FIG. 7 is a schematic block diagram form showing a detailed arrangement of a processing circuit.

FIG. 7 shows a detailed arrangement of mixing circuit 20 of FIG. 5, in which line memories and delay circuits to perform time compression, decoding of alignment of the signals divided into two channels, skew correction, and generation of drop-out compensation signals are provided. The line memories and the delay circuits can be realized by RAMs and address controllers, or the line memories in the time base correctors 18 and 19 may be utilized in the alternate embodiment.

Figure 9A:
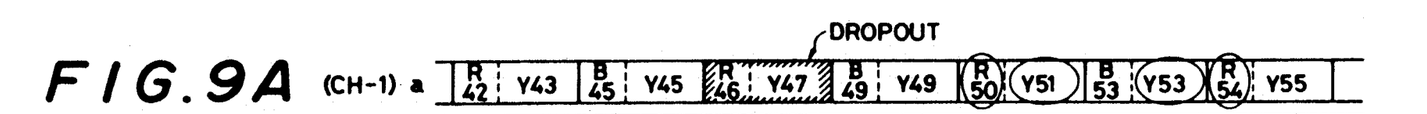
FIGS. 9A, 9B, 9C, 9F, 9I, 9J, 9K, 9L, 9M, 9N and 9O are timing charts useful in explaining drop-out processing.
Figure 10A:
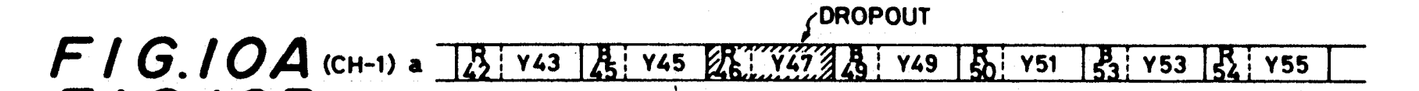
FIGS. 10A, 10B, 10C, 10D, 10I, 10P, 10Q, 10R, 10S, 10T, 10U and 10V are timing charts useful in explaining drop-out processing.
Figure 10B:
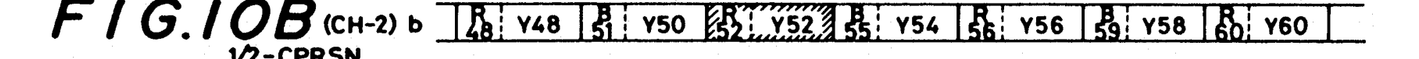
Figure 10C:
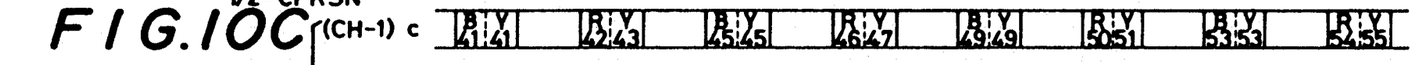
Figure 10D:
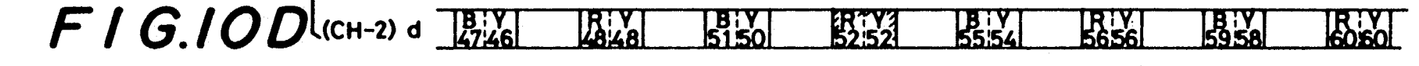
Figure 10I:
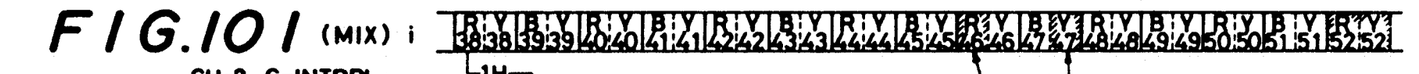

It should be noted, relative to FIGS. 9A+ and 10, that the ratios of the time widths for Y and R or B are not to scale because of size limitations of the drawings. The time width of the luminance portion is greater than the chrominance portion.

Figures 8A, 8B:
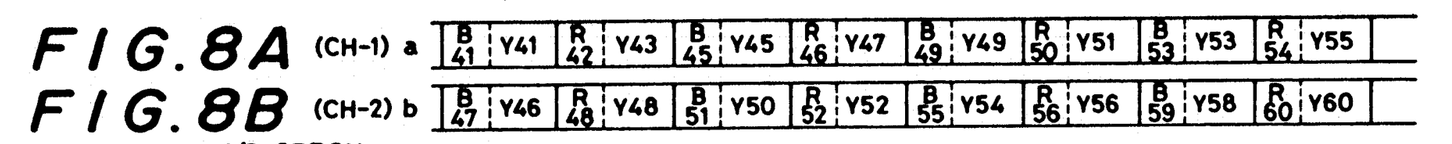
FIGS. 8A-8I are timing charts useful in explaining decoding processing.
Figure 8C:
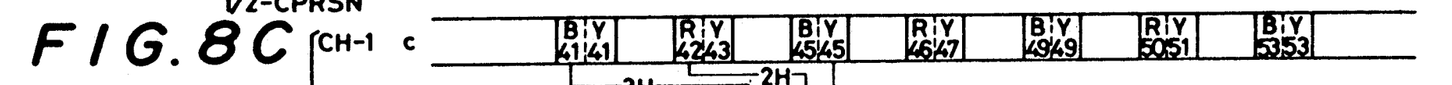
Figure 8D:
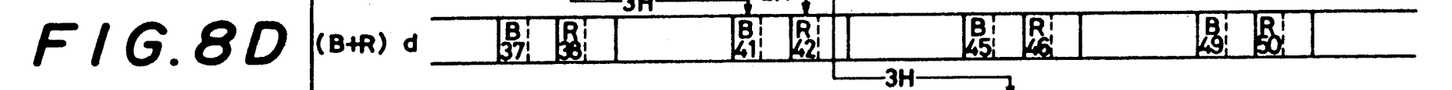
Figure 8E:
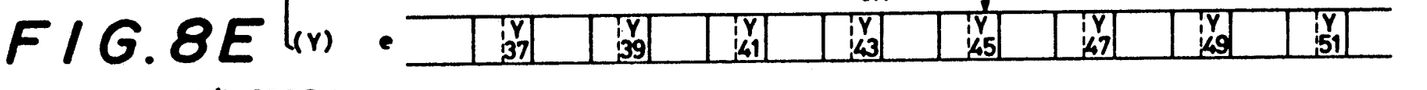
Figure 8F:
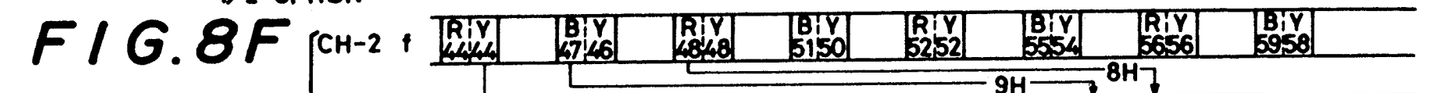

Playback signals a and b, which are the time base corrector outputs, for the respective channels shown in timing charts FIGS. 8A and 8B ar respectively supplied to Y/C separators 40 and 41. The time-division multiplexed components Y and C are separated, and the separated components are written in line memories 42 to 45, each having a period of 2H on the disk. The written components are time-compressed to ½ by reading out in response to a read-clock signal having a frequency twice that of the write-clock signal. FIGS. 8C and 8F show time compression outputs. Although the components Y and C (B and R) are not separated in FIGS. 8C and 8F for the sake of descriptive convenience, the components can be separated, as shown in signal paths in FIG. 7, or the Y and C signals may be separated after time compression.

In the first channel, a B signal portion in the output from line memory 42 is derived through a 3H delay circuit 46, and an R signal portion is derived through a 2h delay circuit 46, and an R signal portion is derived through a 2H delay circuit 47. These signals are mixed again, as shown in FIG. 8D. The 2H and 3H delays may be realized by control operations of read timings of line memory 42. The Y signal output from line memory 43 is output through a 3H delay circuit 48, as represented in 8E.

Figure 8G:
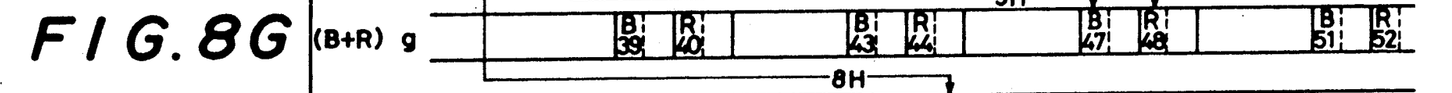
Figure 8H:
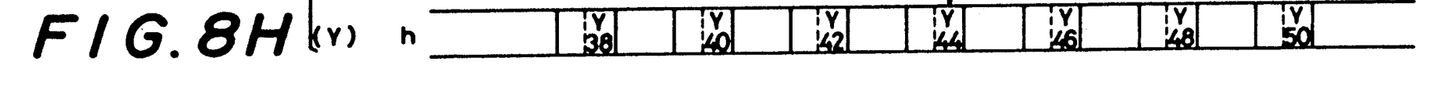

In the second channel, in the same manner as in the first channel, a B signal portion in an output from line memory 44 is derived through a 9H delay circuit 49, and an R signal portion is derived through an 8H delay circuit 50. These signals are mixed again, as shown in FIG. 8G. The Y signal output from the line memory 45 is output through an 8H delay circuit 51 (FIG. 8H).

Figure 8I:
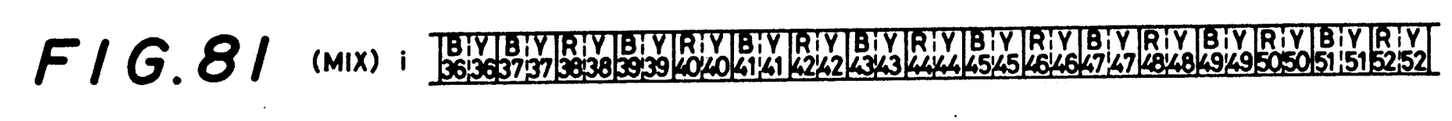

Outputs d, e, g, and h, from the delay circuits 46 to 51 are respectively supplied to U contacts of switches SW-11, 12, 13, and 14, and are combined by commonly coupling the movable contact outputs from the switches, thus being output as the line sequential reproduced signal i shown in FIG. 8I. The delay circuits 46 to 51 have delay amounts to correct skews of pairs of parallel signals for two channels and to decode the parallel signals into a line-sequential serial signal.

Outputs from line memories 42 and 44 are also supplied to the mean value compensation circuit. More specifically, a B signal portion derived from line memory 42 in the first channel is delayed by a 1H delay circuit 52 by 1H, and is coupled to a non-delayed R signal portion, as shown in FIG. 9J. A composite signal j is supplied to a 4H delay circuit 53. A delay output k (FIG. 9K) from delay circuit 53 is added to the input j thereto by an adder 54, and is level-decreased to ½, so that a mean value signal, shown in FIG. 9L, is formed.

Figure 9B:
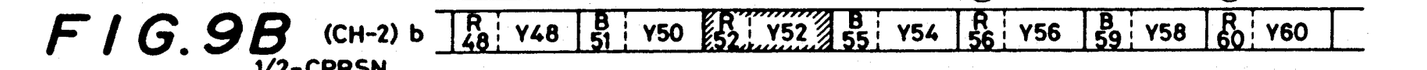
Figure 9C:
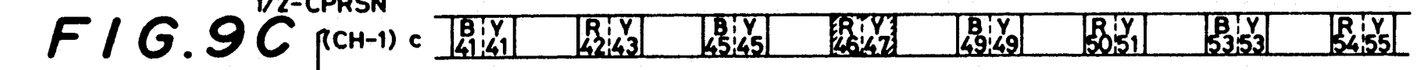
Figure 9F:
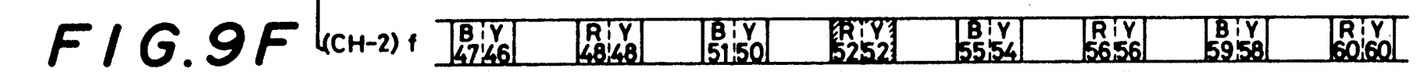
Figures 9I, 9J:
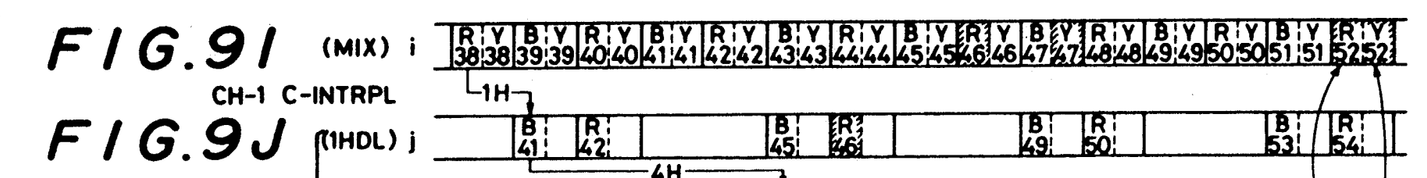
Figure 9K:
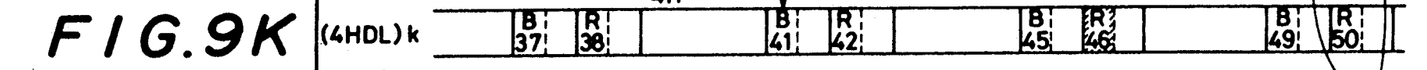
Figure 9L:
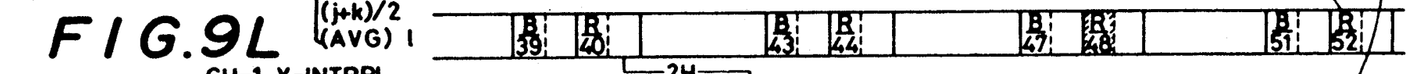
Figure 9M:
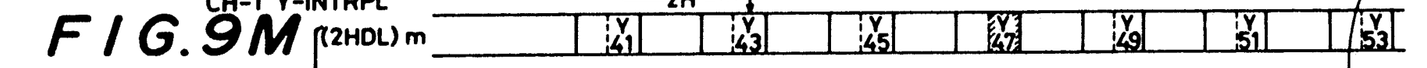
Figure 9N:
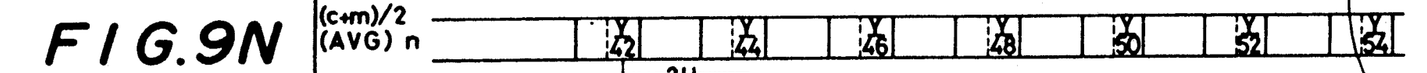
Figure 9O:
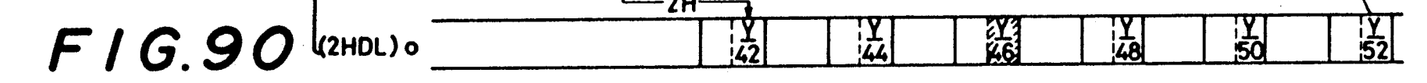

The Y signal output from line memory 43 in the first channel is delayed by a 2H delay circuit 55, as shown in FIG. 9M. An input c to the circuit 55 is added to an output m therefrom by an adder 56, and the sum is averaged, thus forming a mean value signal n shown in FIG. 9N. This signal n is further delayed as a signal o by a 2H delay circuit 57 (FIG. 9O).

Compensation signals l and o formed by mean value processing are respectively supplied to D contacts of the switches SW-11 and SW-12. When a drop-out has occurred in the second channel the drop-out detection pulse DO2 is supplied to these switches SW-11 and SW-12 as a switching signal, and the mean value compensation signals l and o are respectively output from the switches in place of the reproduced signals a and e.

As shown in the timing chart for drop-out compensation in FIGS. 9A+, when reproduced signals R52 and U52, as shown in FIG. 9B, in the second channel are dropped out, the drop-out portions are compensated by mean value compensation signals $\overline{R52}$ and $\overline{Y52}$ formed by the above-mentioned mean value circuit on the basis of reproduced signals R50 and R54, Y51 and Y53, as shown in FIG. 9A, of the first channel side, as shown in FIG. 9I. Since the corresponding portions in each channel are shifted in the longitudinal direction of the track due to the 4H channel skew, the drop-out in one channel can be accurately compensated by a normally reproduced signal from the other channel.

Figure 10P:
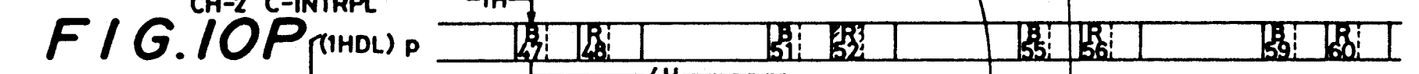
Figure 10Q:
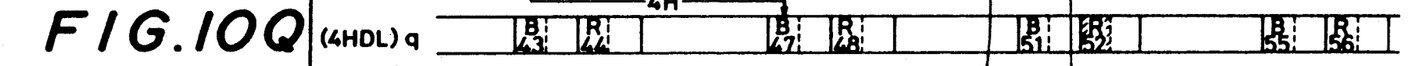
Figure 10R:
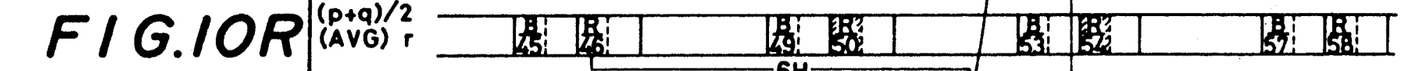
Figure 10S:
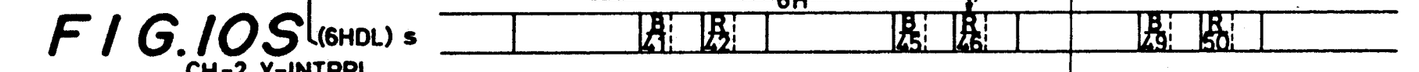

Similarly, a drop-out in the first channel is compensated on the basis of the reproduced signal from the second channel. More specifically, the B signal portion in the output from line memory 44 in the second channel is delayed by a 1H delay circuit 58 by 1H, and is coupled to a nondelayed R signal portion, as shown in FIG. 10P. A composite signal p is supplied to a 4H delay circuit 59. A delay output q (FIG. 10Q) from delay circuit 59 is added to an input p thereto by an adder 60, and the sum is level-decreased to ½, so that a mean value signal r, shown in FIG. 10R, is formed.

Figure 10T:
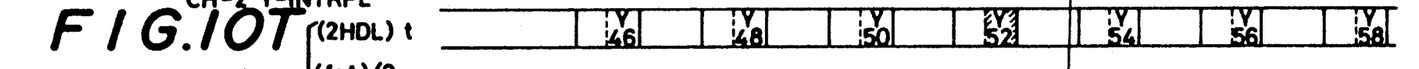
Figure 10U:
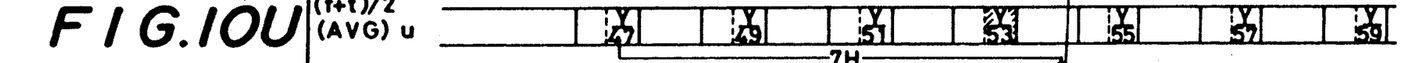
Figure 10V:
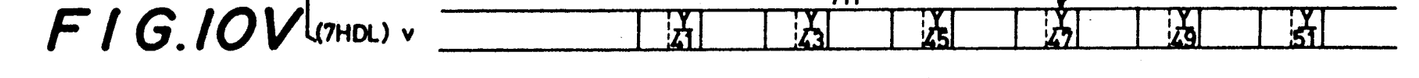

The Y signal output from line memory 45 for the first channel is delayed by a 2H delay circuit, as shown in FIG. 10T. An input f to delay circuit 62 is added to an output t by an adder 63, and the sum is averaged, so that a mean value signal u, shown in FIG. 10U, is formed. This signal u is further delayed as a signal v by a 7H delay circuit 64, as shown in FIG. 10V.

Compensation signals s and v formed by mean value processing are respectively supplied to D contacts of switches S-13 and SW-14, and are output in place of the reproduced signal i when a drop-out has occurred in the first channel.

As shown in the timing chart of FIGS. 10A+, when reproduced signals R46 and Y47, as shown in FIG. 10A, in the first channel are dropped out, the drop-out portions are compensated by mean value signals $\overline{R46}$ and $\overline{Y47}$ formed on the basis of normally reproduced signals R44, R48, Y46, and Y48.

It will be noted that of switches SW-11 to SW-14, switches SW-11 and SW-12 for the first channel are controlled by the drop-out detection pulse DO2 of the second channel, and switches SW-13 and SW-14 for the first channel are controlled by the drop-out detection pulses DO1 of the first channel. The drop-out detection pulses DO1 and DO2 are supplied to the switches as switching control signals after an optimal delay time and a pulse width are given thereto.

As described above, in the present invention, video signals are alternately divided into two channels in units of lines, and the divided channels are recorded on the disk as spiral parallel tracks for the two channels. Recording operations in the channels are simultaneously processed (in parallel) without using field memories in both the recording and reproduction systems. Signal processing for recording/reproduction can be performed by using a memory of only several lines. An interline mean value of one channel can form a compensation signal approximating the other channel.

Since timing displacement (skew) is provided between the channels during the recording operation, upon occurrence of a drop-out in a reproduced signal in one channel there is a low probability that a compensation signal produced from the other channel for the drop-out portion would be damaged due to that drop-out. Therefore, as the signal compensation is performed from one channel to the other channel, satisfactory and highly reliable drop-out compensation can be achieved.

Furthermore, because a mean value compensation is performed, discontinuous oblique lines do not appear in an image so that degradation of the image quality can be avoided.

Also, although in the above-described embodiment, the control (CTL) signal is used to detect the tape position, the method of detecting the tape position need not be so limited and any other signal corresponding to a CTL signal could be used for such purpose.

The above description is given on a single preferred embodiment of the invention, but it will be apparent that many modifications and variations could be effected by one skilled in the art without departing from the spirit or scope of the novel concepts of the invention, which should be determined by the appended claims.

What is claimed is:

1. A drop-out compensating circuit for video signals reproduced simultaneously from first and second tracks of a recording medium, wherein a first track includes a first video signal having every other video line of an original video signal and a second track includes a second video signal having the remaining video lines of the original video signal that are positionally dislocated by an integer multiple of a time interval of one recording video line relative to the first video signals, the circuit comprising:

a first compensation signal generating circuit receiving a reproduced said first video signal, a second compensation signal generating circuit receiving a reproduced said second video signal and including skew correcting means for relocating the positionally dislocated lines of the original video signal, first switching means coupled to said first video signal and said second compensation signal generating circuit for compensating a drop-out video signal present in said first video signal with an output of said second compensation generating circuit, and second switching means coupled to said second video signal and said first compensation signal generating circuit for compensating a drop-out video signal present in said second video signal with an output of said first compensation generating circuit.

2. A drop-out compensating circuit according to claim 1, further comprising:

drop-out detector means coupled to a first video signal reproduced from said first track for generating a first drop-out detection signal supplied to said first switching means and coupled to a second video signal reproduced from said second track for generating a second drop-out detection signal supplied to said second switching means.

3. A drop-out compensating circuit according to claim 2, wherein said first compensation signal generating circuit includes a first mixing circuit for mixing two successive video lines of said first video signal and said second compensation signal generating circuit includes a second mixing circuit for mixing two successive video lines of said second video signal.

* * * * *